(12) United States Patent
Joo et al.

(10) Patent No.: US 7,171,976 B2
(45) Date of Patent: Feb. 6, 2007

(54) STEAM TRAP WITH FLOAT

(76) Inventors: Soon Kyu Joo, Sintri APT 203-613, Sin-Jung 3 dong, Yangcheon gu, Seoul (KR); Sun Kyu Joo, 144-11 Sanford Ave. #5K, Flushing, NY (US) 11355

( * ) Notice: Subject to any disclaimer, the term of this patent is extended or adjusted under 35 U.S.C. 154(b) by 0 days.

(21) Appl. No.: 11/210,985

(22) Filed: Aug. 24, 2005

(65) Prior Publication Data
US 2006/0060241 A1    Mar. 23, 2006

(30) Foreign Application Priority Data
Sep. 18, 2004 (KR) ............... 20-2004-0026866

(51) Int. Cl.
*F16T 1/20* (2006.01)
(52) U.S. Cl. .................... 137/192; 137/434
(58) Field of Classification Search ............ 137/192, 137/194, 549, 550, 434
See application file for complete search history.

(56) References Cited
U.S. PATENT DOCUMENTS

| | | | | |
|---|---|---|---|---|
| 1,130,349 | A * | 3/1915 | Templeton | ............ 137/192 |
| 2,825,508 | A * | 3/1958 | Velan et al. | ............ 236/53 |
| 3,877,479 | A * | 4/1975 | Miyawaki | ............ 137/185 |
| 4,300,719 | A * | 11/1981 | Balazs | ............ 236/53 |
| 4,623,091 | A | 11/1986 | Stein | |
| 4,630,633 | A | 12/1986 | Vallery | |
| 5,065,785 | A | 11/1991 | Deacon et al. | |

* cited by examiner

*Primary Examiner*—Kevin Lee
(74) *Attorney, Agent, or Firm*—John K. Park; Park Law Firm

(57) ABSTRACT

Provided is a steam trap, in which an inlet and an outlet in a body are formed collinearily and a float for opening/closing the outlet is included. The steam trap having a float within a case includes the case, a cover, a strainer, the float, an arm, a gate, a lever, and a valve plug. The case includes therein an inlet through which condensate and water flow in and an outlet through which the condensate flow out. The cover is bolt-coupled to the case. The strainer is formed in the inlet and filters foreign substances. The float is formed within the case. The arm is formed at the bottom of the float. The gate is screw-engaged with one side of the case and has an orifice formed therein. The lever connects the gate and the arm. The valve plug is formed in the lever and opens and closes the outlet.

3 Claims, 4 Drawing Sheets

STEAM TRAP WITH FLOAT

BACKGROUND OF THE INVENTION

1. Field of the Invention

The present invention relates to a steam trap, and more particularly, to a steam trap in which an inlet and an outlet are formed collinearly in a body and a float for opening/closing the outlet is mounted inside the body.

2. Background of the Related Art

A steam trap, generally used in a heat exchanger, is a kind of automatic valve designed to efficiently remove condensate generated by condensation of steam in a drum or a pipe while preventing the leakage of live steam.

U.S. Pat. Nos. 4,630,633 and 5,065,785 disclose steam traps. In these conventional steam traps, a bucket is formed to move by steam and condensate within a case and a vent is provided at one side of the top of the bucket. The bucket closes an outlet using the force of introduced steam, and the outlet is opened due to the weight of the bucket after steam escapes from the inside of the case through the vent. Through periodic repetition of those operations, steam and condensate are exhausted.

In general, such a steam trap is designed to exhaust condensate generated in a pipe. The conventional steam trap having the bucket formed within the case periodically performs repetitive operations regardless of generation of condensate, and exhausts condensate contained therein only through the shaking of the bucket, resulting in much leakage of steam.

For example, in a laundry, the escape of steam from a chimney is caused due to problems associated with a conventional bucket-type steam trap. In addition, a boiler should operate continuously due to the loss of steam caused in the conventional bucket-type steam trap at the time of setting steam pressure of the boiler, leading to a vast loss of energies such as gas, electricity, water, and so forth required for operating the boiler.

Moreover, the life span of the boiler and peripheral devices is shortened due to the continuous operation of the boiler, and the capacity of the boiler generally exceeds the amount used.

To address the disadvantage of the conventional bucket-type steam trap, such a steam trap with a float as in U.S. Pat. No. 4,623,091 has been developed and used. In the steam trap disclosed by U.S. Pat. No. 4,623,091, an exit opening and an inlet opening are formed perpendicularly to each other so that condensate flows from the inside of a machine or a lower portion of a steam outlet to the steam trap and is then exhausted. However, if the height of the machine is low, the steam trap is not available and the laying of exhaust pipes becomes complicated. Moreover, since a structure of a valve plug for closing the outlet opening is unreasonable, it is difficult to accurately close the outlet opening. Furthermore, a float should be located far apart from a pin (hinge) to obtain buoyancy overcoming the weight of the valve plug, an arm, the float and so on, which results in a relative increase in the size of the steam trap as compared to its capacity, leading to an increase in the manufacturing cost.

SUMMARY OF THE INVENTION

Accordingly, the present invention has been made in view of the above-mentioned problems, and it is an object of the present invention is to provide a steam trap with a float having an inlet and an outlet formed collinearlly, which facilitates the laying and repair of pipes and can be installed in a low position, thereby simplifying its structure to avoid mechanical trouble and reducing the unit cost of a product.

Another object of the present invention is to provide a steam trap with a float, which has a simple structure while having high efficiency and thus efficiently removes condensate generated by condensation of steam in a drum or a pipe without the leakage of live steam.

To achieve the above objects, according to the present invention, there is provided a steam trap having a float within a case includes the case, a cover, a strainer, the float, an arm, a gate, a lever, and a valve plug. The case includes therein an inlet through which condensate and water flow in and an outlet through which the condensate flow out. The cover is bolt-coupled to the case. The strainer is formed in the inlet and filters foreign substances. The float is formed within the case. The arm is formed at the bottom of the float. The gate is screw-engaged with one side of the case and has an orifice formed therein. The lever connects the gate and the arm to each other. The valve plug is formed at the lever and opens and closes the outlet.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
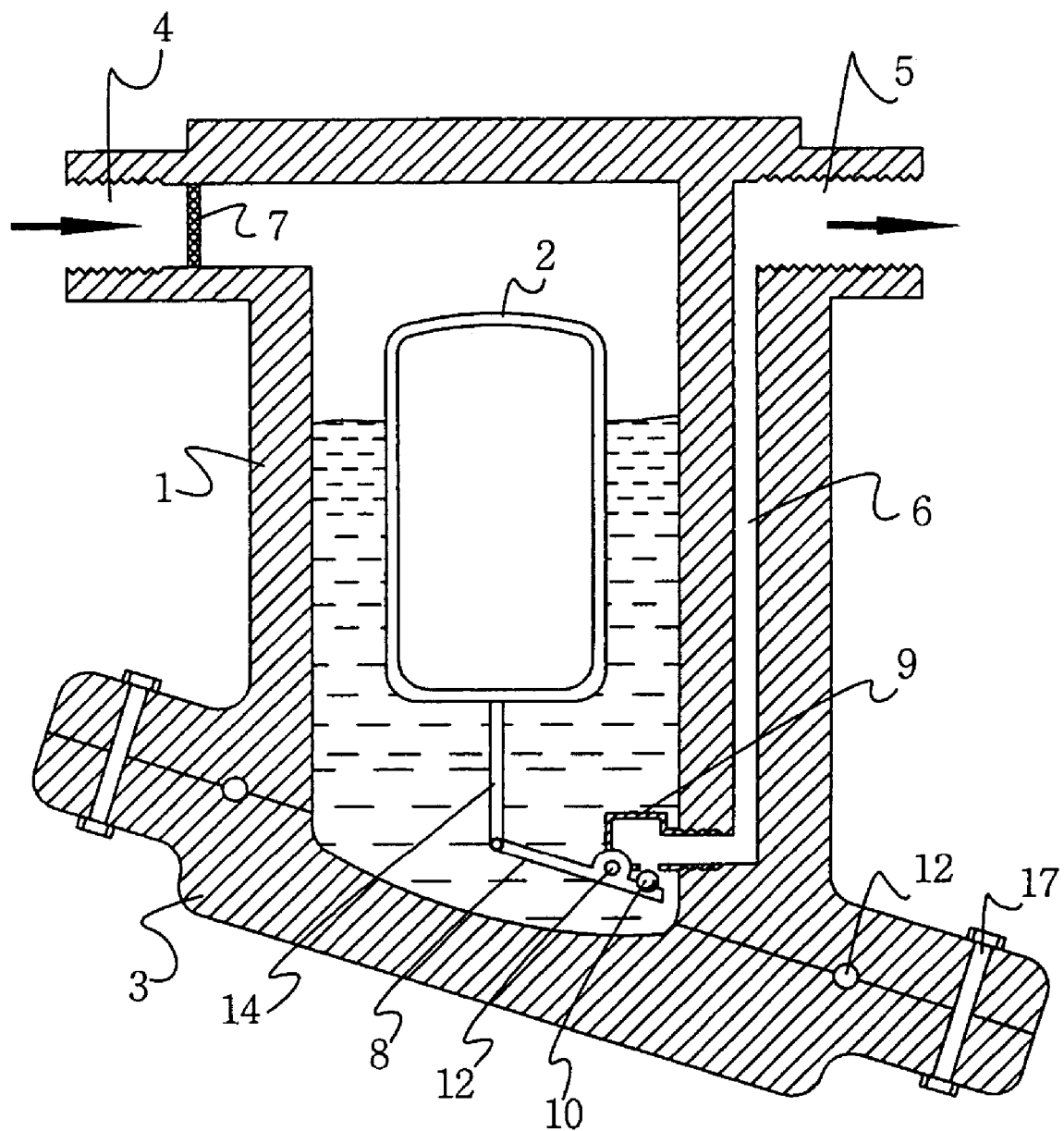
FIG. 1 illustrates a structure of a steam trap with a float according to one embodiment of the present invention.

FIG. 1 illustrates a structure of a steam trap with a float according to an embodiment of the present invention. The steam trap includes a case 1 having an inlet 4 and an outlet 5 formed therein, a strainer 7, a float 2, an arm 14, a gate 9, a lever 8, and a valve plug 10. Condensate and steam flow in through the inlet 4 and flow out through the outlet 5. The strainer 7 is formed in the inlet 4. The float 2 is formed within the case 1. The arm 14 is formed at the bottom of the float 2. The gate 9 is screw-engaged with one side of the case 1 and has an orifice 11 formed therein. The lever 8 connects the gate 9 and the arm 14 to each other. The valve plug 10 is formed in the lever 8 to open/close the outlet 5.

The strainer 7 filters foreign substances of condensate flowing inside the case 1 and should be replaced after a predetermined period of time.

The float 2 is usually molded of stainless steel (STS) or synthetic resin. The arm 14 is formed at the bottom of the float 2, and the arm 14 and the lever 8 are pivotally coupled to each other.

The lever 8 is coupled to the gate 9 and pivotally rotates about a pin 12 of the gate 9.

Figure 2:
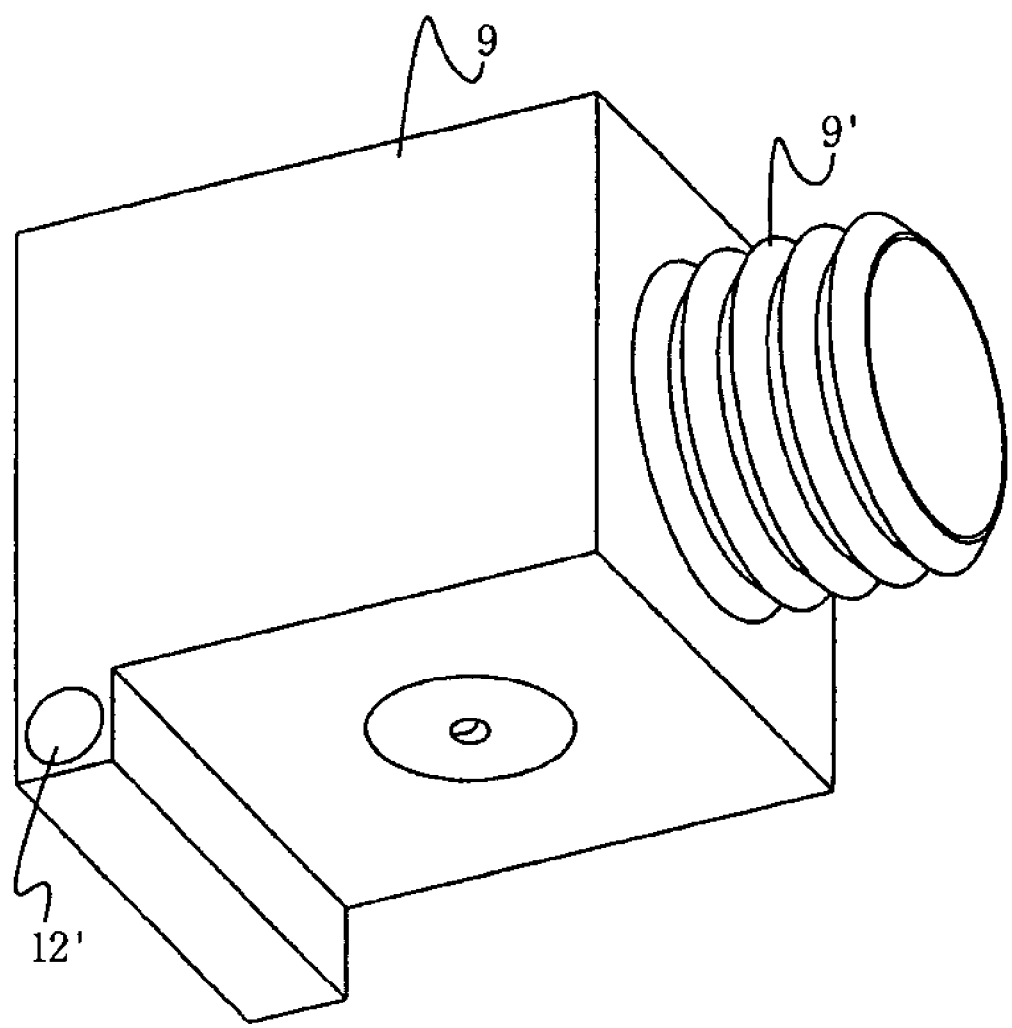
FIG. 2 illustrates a structure of a gate according to the present invention.

FIG. 2 illustrates a structure of the gate 9 according to the present invention. A bolt is protrudingly formed at a side of a hexahedral body to be coupled with the case 1. A hole is formed at the bottom of the hexahedral body to be opened and closed by the valve plug 10. An orifice is formed inside the hexahedral body to allow condensate to flow through the gate 9.

Pins are formed at both sides of the gate 9 to fix the lever 8.

Figure 3:
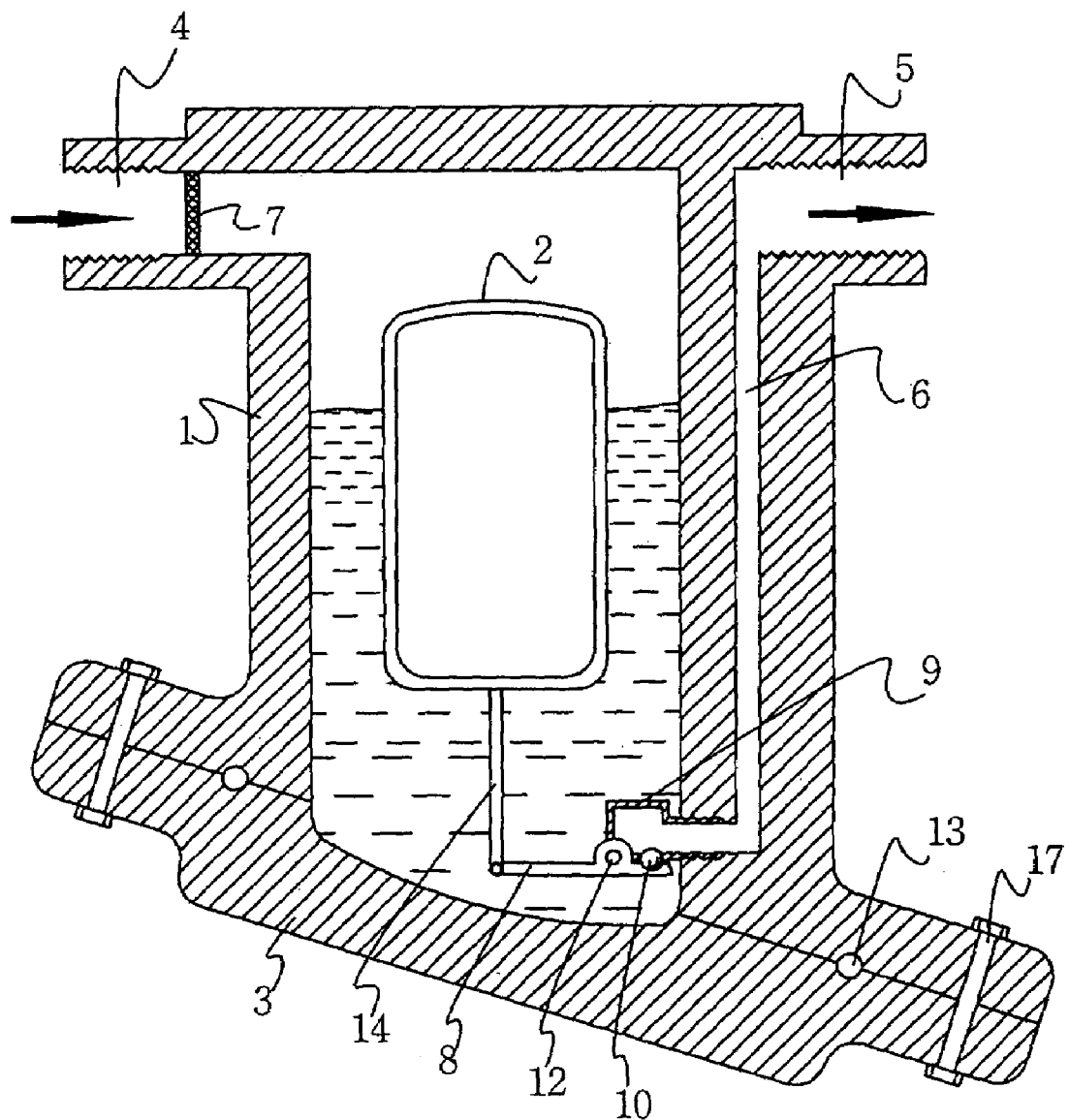
FIG. 3 is a view for explaining an exemplary operation according to the present invention.

FIG. 3 is a view for explaining an exemplary operation according to the present invention, in which condensate is exhausted through the outlet 5. In other words, as the float 2 rises, the arm 14 and the lever 8 ascend and the valve plug 10 formed at the end of the lever 8 descend with respect to the pin 12, thereby opening an outlet passage 6.

Once condensate exceeds a predetermined level in the case 1, the float 2 moves upwardly and the outlet passage 6 is opened, thereby exhausting the condensate through the outlet 5.

Figure 4:
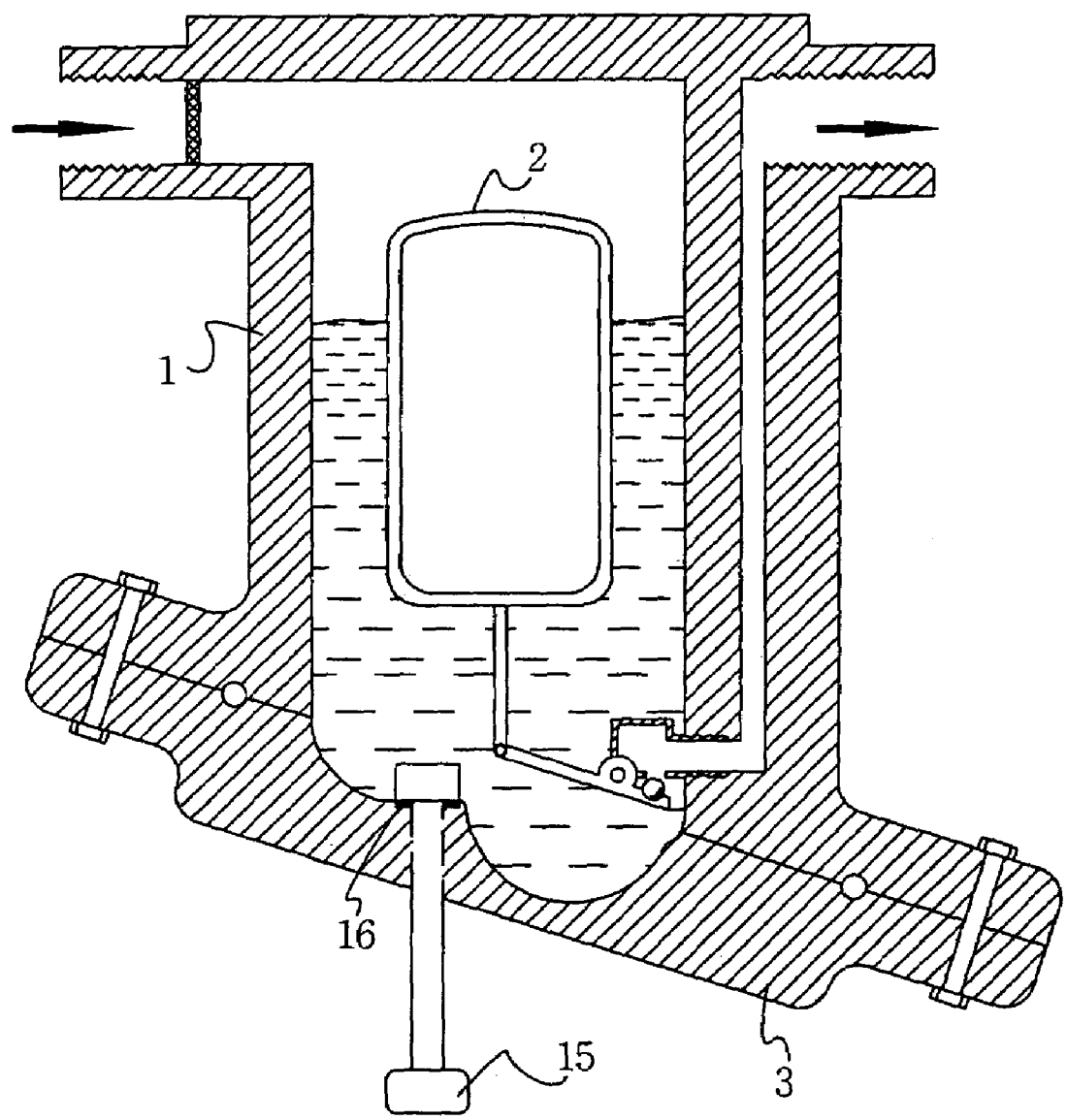
FIG. 4 illustrates a steam trap with a float according to another embodiment of the present invention.

FIG. 4 illustrates a steam trap with a float according to another embodiment of the present invention, which further includes a hammer 15 that is formed under the bottom of the case 1 and can be manually reciprocated.

The hammer 15 may be formed under the bottom of or on the top of the case 1 according to use environments. In other words, when the steam trap according to the present invention is installed in a higher position, it is desirable to form the hammer 15 under the bottom of the case 1. When the steam trap is installed in a lower position, it is desirable to form the hammer 15 on the top of the case 1.

Since the coupled portions of the case 1, a cover 3, and the hammer 15 are hermetically sealed by an O-ring 13, condensate is not leaked through a gap even when the hammer 15 moves vertically. In addition, when the operation of the steam trap is not smooth due to foreign substances such as limestone, sphagnum, or sand, artificial shock is applied to the float 2 using the hammer 15, thereby facilitating the operation of the float 2 or the lever 8.

As described above, according to the present invention, an inlet and an outlet are formed collinearly in a case, thereby facilitating the laying and repair of the pipe and enabling installation in a lower position.

In addition, a float is of a vertical type to increase buoyancy and a lever and a plug are formed integrally with each other to improve precision in operation. As a result, the total size of a steam trap is reduced, and thus the steam strap can be installed in a smaller space.

Moreover, the structure of a steam trap with a float is simplified, thereby avoiding mechanical trouble and reducing the unit cost of a product. Furthermore, because of having a simple structure while having high efficiency, the steam trap efficiently removes condensate generated by condensation of steam in a drum or a pipe without the leakage of live steam.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A steam trap having a float, the steam trap comprising:
   a case in which the float is contained and which includes therein an inlet through which condensate and water flow in and an outlet through which the condensate flow out;
   a cover which is bolt-coupled to the case;
   a strainer which is formed at the inlet and filters foreign substances;
   an arm which is formed at the bottom of the float;
   a gate which is screw-engaged with one side of the case and has an orifice formed therein;
   a lever which connects the gate and the arm to each other; and
   a valve plug which is formed at the lever and opens and closes the outlet,
   wherein a face of the case, which is coupled to the cover, is inclined to facilitate the processing of an inner face of the case.

2. The steam trap of claim 1, wherein the inlet and the outlet are formed collinearily in the case.

3. The steam trap of claim 1, wherein a hammer is formed in the cover to facilitate the operation of the float or the lever by applying an artificial shock to the float when the steam trap is not smoothly operated.

* * * * *